United States Patent [19]

Hattori et al.

[11] Patent Number: 5,579,562
[45] Date of Patent: Dec. 3, 1996

[54] INTERENGAGING FASTENER HAVING LOCATING FEATURE

[75] Inventors: Jiro Hattori, Atsugi; Shinji Torigoe, Sagamihara; Norihito Shibahara, Hachioji; Osamu Sawajiri; Hideo Matsumoto, both of Sagamihara, all of Japan

[73] Assignee: Minnesota Mining and Manufacturing Company, St. Paul, Minn.

[21] Appl. No.: 285,175

[22] Filed: Aug. 3, 1994

[30] Foreign Application Priority Data

Aug. 3, 1993 [JP] Japan .................................. 5-192406

[51] Int. Cl.⁶ .................................................. A44B 18/00
[52] U.S. Cl. .............................. 24/452; 24/450; 24/306; 24/442
[58] Field of Search .......................... 24/442, 452, 450, 24/306, 444, 446, 447, 575–577

[56] References Cited

U.S. PATENT DOCUMENTS

| | | | |
|---|---|---|---|
| 3,403,429 | 10/1968 | Smith | 24/442 X |
| 4,216,257 | 8/1980 | Schams et al. | 428/93 |
| 4,290,174 | 9/1981 | Kalleberg | 24/204 |
| 4,290,832 | 9/1981 | Kalleberg | 156/72 |
| 4,322,875 | 4/1982 | Brown et al. | 24/204 |
| 4,454,183 | 6/1984 | Wollman | 428/92 |
| 4,563,380 | 1/1986 | Black et al. | 428/100 |
| 4,706,914 | 11/1987 | Ground | 248/74.3 |
| 4,710,414 | 12/1987 | Northrup et al. | 428/43 |
| 4,784,890 | 11/1988 | Black | 428/100 |
| 5,058,245 | 10/1991 | Saito | 24/442 X |
| 5,077,870 | 1/1992 | Melbye et al. | 24/452 |
| 5,179,767 | 1/1993 | Allan | 24/442 |
| 5,212,853 | 5/1993 | Kaneko | 24/442 X |
| 5,235,731 | 8/1993 | Anzai et al. | 24/576 |
| 5,242,646 | 9/1993 | Torigoe et al. | 264/219 |

*Primary Examiner*—Peter M. Cuomo
*Assistant Examiner*—Robert J. Sandy
*Attorney, Agent, or Firm*—Gary L. Griswold; Walter N. Kirn; Leland D. Schultz

[57] ABSTRACT

An interengaging fastener is provided including two fastener members and structure for locating one fastener member with respect to the other fastener member. In one embodiment, the locating structure includes a protrusion extending from one fastener member and an opening formed in the other fastener member.

1 Claim, 7 Drawing Sheets

INTERENGAGING FASTENER HAVING LOCATING FEATURE

TECHNICAL FIELD

The present invention relates to an interengaging fastener including two fastener members and structure for locating one fastener member with respect to the other fastener member.

BACKGROUND OF THE INVENTION

One conventional type of fastener includes two substantially identical fastener members that each have a base and a plurality of headed stems adjoining and projecting from the base. The fastener members, and hence the objects to which the fastener members are attached, may be releasably fastened to each other by compressively engaging the fastener members. Fasteners of this type are advantageous because the engagement force is relatively small and the disengagement force, due to the interference between the respective headed stems, is relatively large.

A conventional fastener of the type described above is illustrated in FIG. 7. The fastener includes a first fastener member 1 and a second fastener member 2, each of which is integrally molded from a polymeric material. The first and second fastener members are provided with generally flat bases 3 and 4, respectively, and a plurality of headed stems 5 arranged on the bases in a predetermined spaced relationship. Each of the headed stems 5 has a stem 6 projecting generally orthogonally from the base and head 7 formed at the end of the stem 6. Each head has a diameter at at least one location that is greater than the diameter of the stem. The head 7 of each headed stem 5 has a generally flat engaging surface 8 adjacent to the stem 6 and extending radially outward from the periphery of the stem 6, and a curved apex 9 at an opposite side of the bottom surface 8.

The first fastener member 1 and the second fastener member 2 are positioned so that the bases 3, 4 are arranged substantially parallel to each other while the headed stems 5 thereof being mutually opposed, as shown in FIG. 7(a). In this position, when a predetermined compressive force is applied to the respective bases, the heads 7 of the headed stems 5 of one fastener member come into contact with and slide against, at the apexes thereof, the heads 7 of the headed stems 5 of the other fastener member. The stems 6 of the headed stems 5 of both fastener members deflect, and heads of each fastener member thus enter into a space between the headed stems 5 of the other fastener member, as shown in FIG. 7(b). The headed stems 5 of one fastener member are engaged, at the engaging surfaces 8, with the engaging surfaces 8 of the other fastener member. In this manner, the first fastener member 1 of the second fastener member 2 are attached to each other.

The conventional interengaging fasteners discussed above are preferably attached to each other by the mutual agreement of all of the headed stems. However, the fastener members can be attached even when only some of headed stems in the respective fastener members are engaged with each other. Accordingly, this type fastener has an advantage in that two independent articles can be attached with each other in any positional relationship. Furthermore, the base of the fastener member can be fixed to the article by using an adhesive tape or the like, the appearance of the articles is not injured.

For some fastening applications, the fastener members are not visible to the operator when the fastener is engaged. These applications are referred to as "blind" fastening applications, and an example of such a blind fastening application is shown in FIG. 8. FIG. 8 illustrates the case of applying a ceiling liner to the interior roof of an automobile. Three fasteners are shown, and those fastener members are not visible to an operator who is installing the ceiling liner. Because the operator cannot see whether and to what degree the fasteners interengage, the first fastener member 1 and the second fastener member 2 can be attached with each other even when only a part of the headed stems of both fastener members are mutually engaged, as shown in FIG. 8(b). This misalignment can result in inaccurate or weak installation, which may detract from both the appearance and the function of the ceiling liner.

If the fastener connecting process is performed by a robot, it may also be desirable to provide a fastener that may be engaged only when the fastener members are within a specified distance of each other, to insure that the fastener members are securely connected. This would allow robots that lack precision to satisfactorily engage the fastener. For example, if one fastener member has an area of 5 cm$^2$ and a second fastener member has an area of 10 cm$^2$, it may be desirable to permit engagement by the robotic apparatus only when the entire area of the first fastener member is engaged with the second fastener member.

In view of the foregoing, it would be desirable to provide a fastener comprising fasteners members of the general type described above, and further including structure for locating one fastener member with respect to the other fastener member, even if neither fastener member is visible to an operator. It is also desirable to provide a fastener comprising two fastener members having a specified range of acceptable interengagement positions.

SUMMARY OF THE INVENTION

The present invention includes within its scope an interengaging fastener member for engagement with an opposed fastener member having a base and a plurality of headed fastener stems adjoining and projecting from the base, the interengaging fastener member comprising a base, a plurality of headed stems arranged on said base in a predetermined spaced relationship, each of said headed stems including a stem adjoining and projecting from said base, and a head connected to a distal end of said stem, and means for locating said fastener member at a predetermined position relative to the opposed fastener member to facilitate interengagement of the respective fastener members. The locating means may take one or more of several different forms, as described in the following detailed description and as shown in the appended drawings.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention relates particularly to a fastener of the type having two fastener members including projecting headed stems, wherein at least one fastener member includes means for locating one fastener member at a predetermined position relative to an opposed, like fastener member to facilitate interengagement of the respective fastener members. According to one embodiment of the present invention, the means for locating the fastener member includes a projecting side surface formed at a predetermined position on the major surface of the base and extending higher than a height of the headed stems. The projecting side surface may define at least one protrusion arranged at a periphery of the base.

Figure 1A:
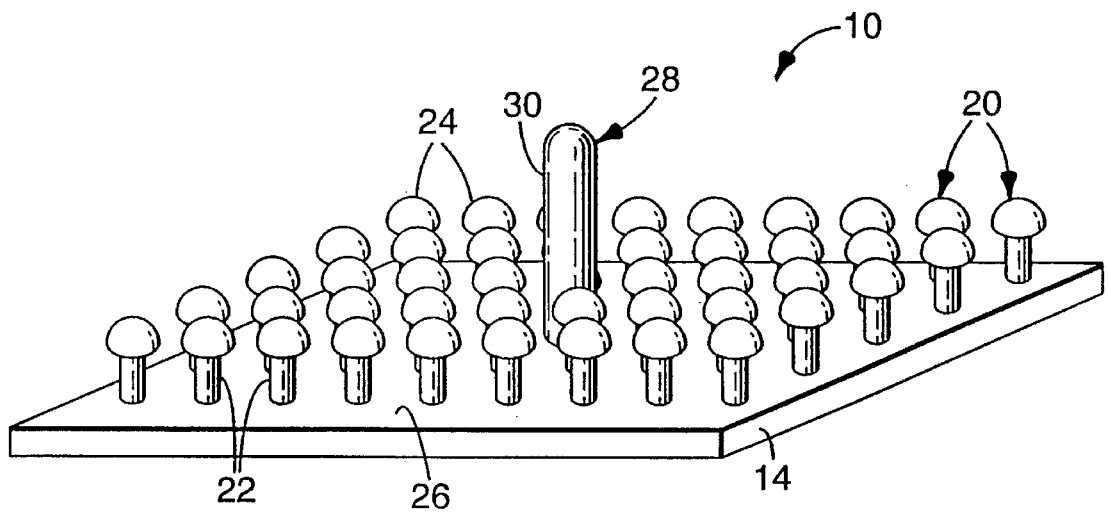
FIGS. 1(a) and 1(b) are perspective views of a first embodiment of a first fastener member and a second fastener member according to the present invention.
Figure 1B:
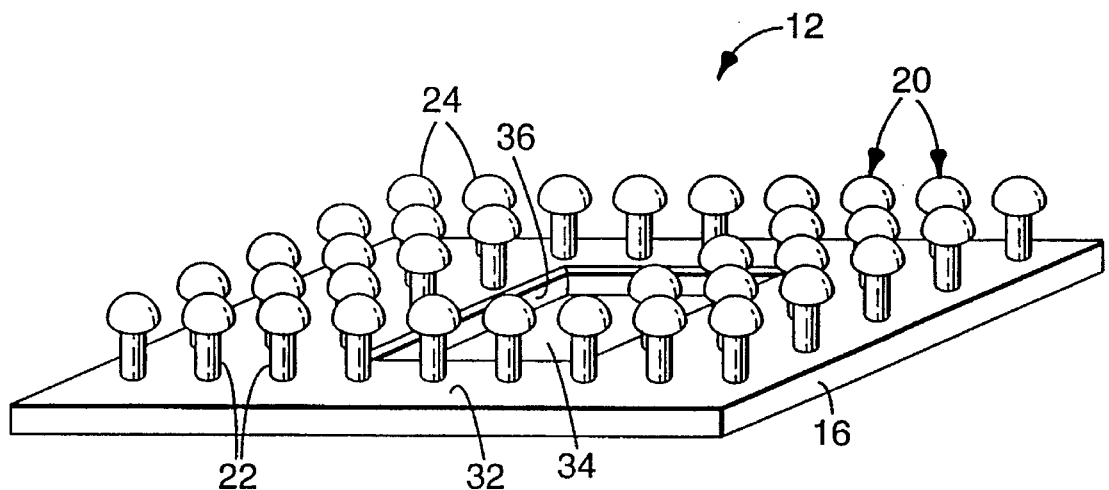
Figure 3:
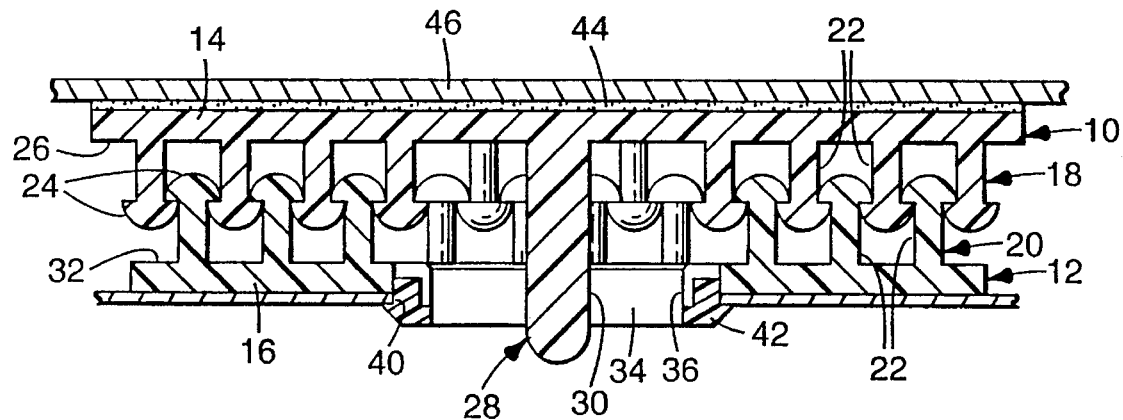
FIG. 3 is a cross-section through the center of the first and second fastener members with the first member inverted and interengaged with the second member.

FIG. 1(a) shows a first interengaging fastener member 10, and FIG. 1(b) shows a second interengaging fastener member 12. Each of the first and second fastener members is molded preferably of the polymeric material as a unitary body, and includes a generally flat base 14 and 16, and a plurality of headed stems 18, 20 arranged on the respective bases in a predetermined spaced relationship. Each of the headed stems has a stem 22 adjoining and projecting substantially orthogonally from the base, and a head 24 formed at the end of the stem 22. The head has a diameter at at least one location that is greater than the diameter of the stem. The stems 22 and heads 24 of the headed stems are arranged and dimensioned so that the interengagement between the headed stems 18 and 20 is possible, as shown in FIG. 3.

In the embodiment of FIG. 1, the first fastener member 10 has one protrusion 28 projecting generally orthogonally from the base 14. The protrusion 28 has a cylindrical projecting side surface 30 extending to a height greater than the height of the headed stems 18. In this embodiment, the projecting height of the projecting side surface 30 of the column-shaped protrusion 28 is designed to be larger than a total height of the headed stem 18 of the first fastener member 10 plus the height of the headed stem 20 of the second fastener member 12.

The second fastener member 12 has a boundary surface 36 defining one opening 34 substantially at a center of a major surface 32 of the base 16. The boundary surface 34 extends substantially vertically to the surface 32 of the base 16. The opening 34 has an area larger by a predetermined value than the maximum area of the protrusion 28 in a cross-section substantially parallel to the surface 26.

Figure 2A:
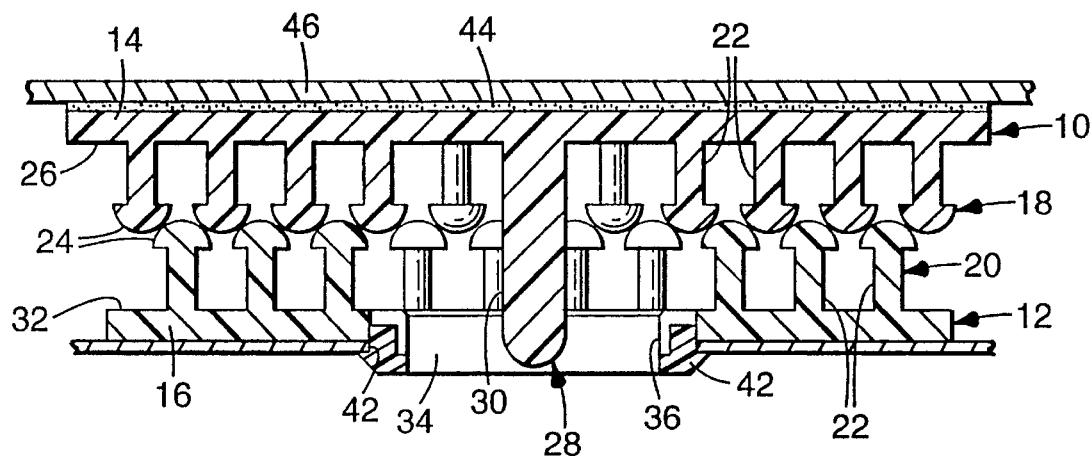
FIG. 2(a) is a cross-section through the center of the first and second fastener members with the first fastener member inverted, prior to interengagement.

As shown in FIG. 2(a), when the first and second fastener members 10 and 12 are prepared for interengagement with each other, the bases 14, 16 are positioned substantially parallel to each other while the heads 24 of the headed stems 18 and 20 are maintained in a face-to-face relationship. In this position, a tip end of the protrusion 28 of the first fastener member 10 is inserted into the opening 34 of the second fastener member 12, so that the projecting side surface 30 of the protrusion 28 is within the boundary surface 36 of the opening 34. In this embodiment, it may be necessary to form an opening 40, corresponding to the opening 34, in an article 38 (only a portion of which is shown in the drawing) fixed with the second fastener member 12, to enable the insertion of the protrusion 28 into the opening 34.

When a predetermined compressire force is applied to the respective bases 14 and 16 in a mutually approaching direction, the heads 24 of the headed stems 18 and 20 of the respective fastener members slide against each other, so as to elastically deflect the stems 22, whereby the heads 24 of the headed stems of one fastener member can enter into spaces between the adjacent stems 11 of the other fastener member. Thus, the fastener members 10, 12 are attached with each other, as shown in FIG. 3. As shown in FIGS. 2 and 3, it is possible to provide connector means, such as a clip 42 projecting from the backside of the base 16, on a part of the boundary surface 36 defining the opening 34 of the second fastener member 12. The clip 42 can be press-fitted with an edge of the opening 40 of the article 38, and can quickly and easily fix the fastener member 12 onto the article 38. Alternatively, the fastener member can be fixed onto the article 46 through an adhesive layer 44 applied on the backside of the base 14, as is the case of the first fastener member 10 illustrated, or by any other suitable mechanical or chemical means.

Figure 2B:
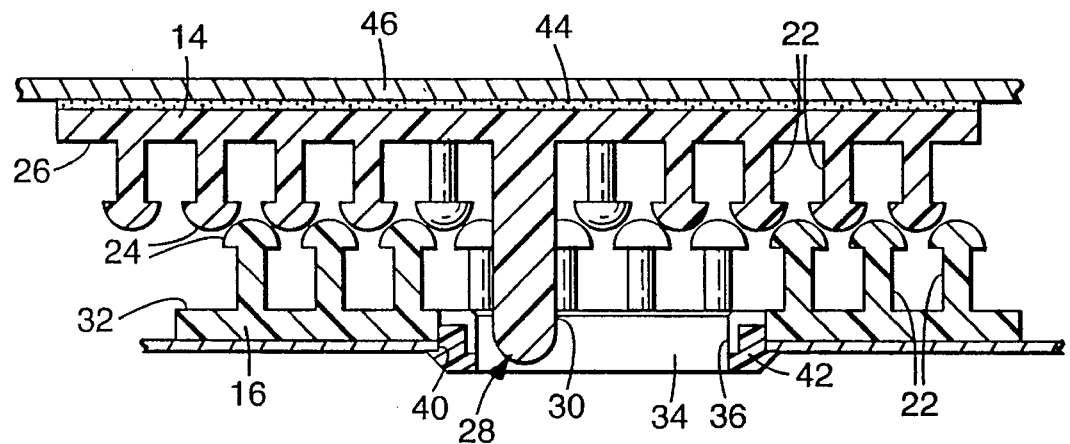
FIG. 2(b) is a cross-section through the center of the first and second fastener members with the first fastener member inverted and off center, prior to interengagement.

In the above interengagement procedure, if the tip end of the protrusion 28 in the first fastener member 10 fails to be inserted into the opening 34 of the second fastener member 12, but instead abuts the surface 32 of the base 16, the heads 24 of the headed stems cannot be in contact with each other. This is because the protrusion 28 has a length longer than a total length of the headed stems 18 and 20, such that the interengagement of the fastener members 10 and 12 is prevented. Alternatively, when the tip end of the protrusion 28 is inserted into the opening 34, the fastener members 10 and 12 can be attached with each other, whether the positional relationship therebetween is as shown in FIG. 2(a) (relatively aligned) or as shown in FIG. 2(b) (relatively misaligned). Thus, the protrusion 28 and the opening 34 permit interengagement between the first and second fasteners only at a predetermined positional relationship, within a tolerance defined by the relative geometry of the projecting side surface 30 and the boundary surface 36. Accordingly, it is possible to provide the fastener with structure for locating one fastener member with respect to the other fastener member prior to engagement.

In another embodiment, it is possible to make the area of the opening 34 to be substantially equal to the maximum area of the protrusion 28, if precise location of the fastener members is required. Also, the length of the protrusion 28 of the first fastener member 10 may be reduced by forming a raised portion which surrounds the opening 34 and projects upright a predetermined height on the surface 32 of the base 16 of the second fastener member 12, so as to increase the height of the boundary surface 36. Further, a plurality of protrusions and openings 34 corresponding thereto may be provided to the first and second fastener members 10 and 12, respectively, if desired.

Figure 4A:
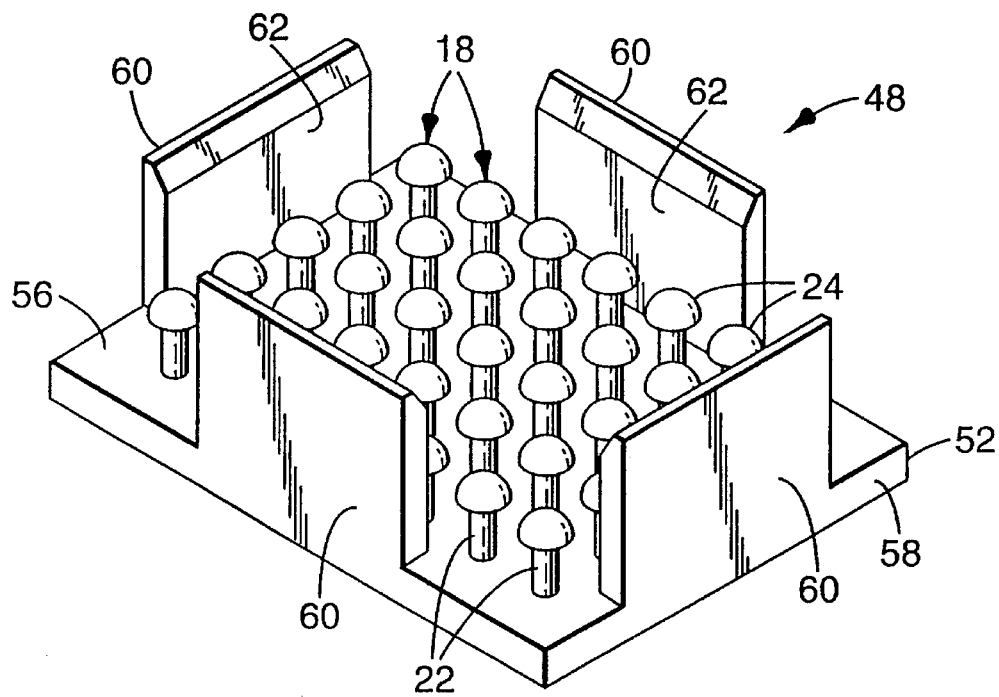
FIGS. 4(a) and 4(b) are perspective views of a second embodiment of the first and second fastener members.
Figure 4B:
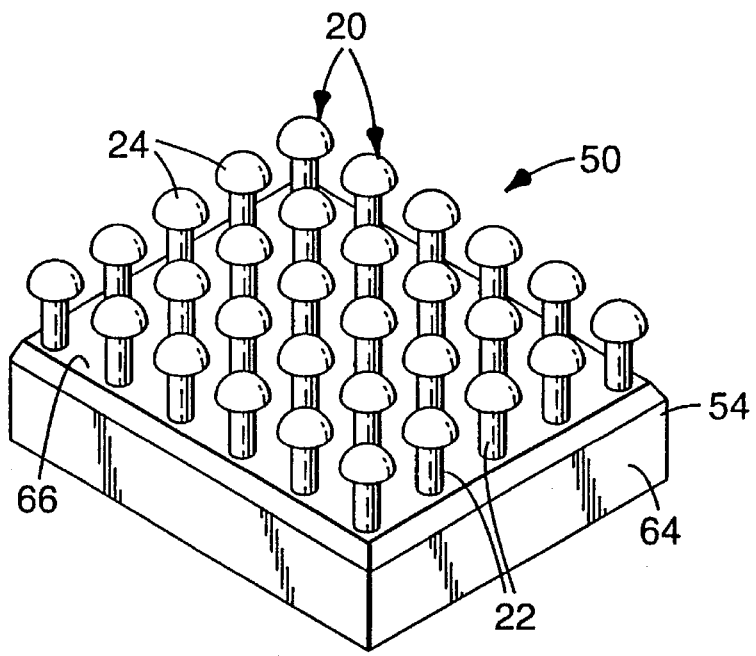

FIG. 4(a) shows a first fastener member 48 of a fastener according to another embodiment of the present invention, and FIG. 4(b) shows a second fastener member 50 thereof. Each of the first and second fastener members is provided with a generally flat base 52 and 54, respectively, and a plurality of headed stems 18 and 20 projecting substantially upright from the base. Each of the headed stems has a stem 22 and a head 24, similarly to the embodiment shown in FIG. 1.

The first fastener member 48 has wall-shaped protrusions 60 extending generally upright along the lengthwise direction on the peripheral edges 58 of a major surface 56 of the base 52. The base 52 may have a generally rectangular shape in plan view, as illustrated, and the wall-shaped protrusions 60 with predetermined thickness are provided on four linear peripheral edges 58 of the base 52. The wall-shaped protrusion 60 has a projecting inner surface 62 extending to a height larger than the projecting height of the headed stem 18. In this embodiment, the height of the projecting inner surface 62 of the wall-shaped protrusion 60 is designed to be larger than the total height of the headed stems of the first fastener member plus the height of the headed stems of the second fastener member.

Figure 5:
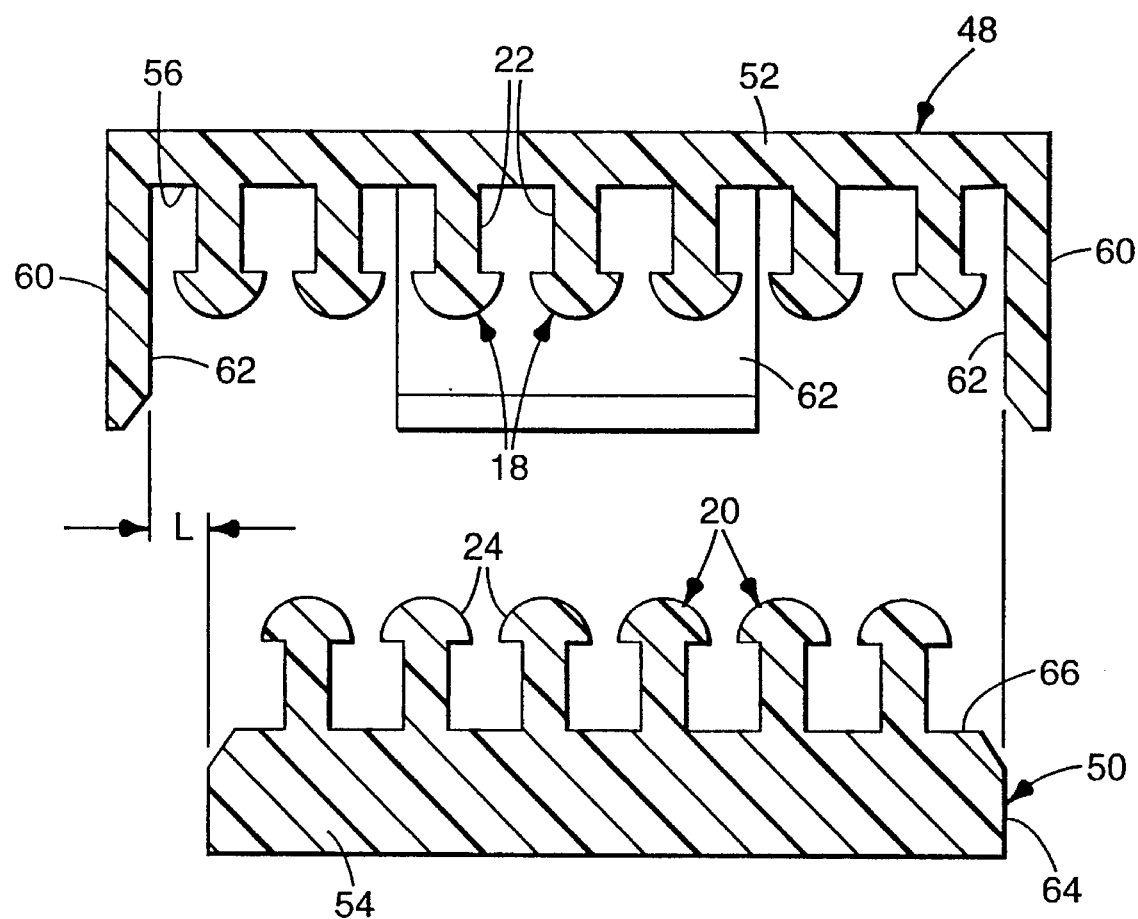
FIG. 5 is a cross-section through the center of the first and second fastener members of the second embodiment with the first fastener member inverted, prior to interengagement.

The second fastener member 50 has a boundary surfaces 64 defining the peripheral edge of the base 54. The boundary surface 64 extends substantially vertical to the major surface 66 of the base 54. The base 54 may have a substantially rectangular shape in a plan view, which is similar to that of the base 52 of the first fastener member 48. The edges of the base 54 are preferably shorter by a predetermined value L (although L could instead be zero) than the distance between opposed wall-shaped protrusions 60 confronting each other, as shown in FIG. 5. Preferably, the base 54 of the second fastener member 50 is thicker than the base 16 of the second fastener member 12. This prevents the tip end of the wall-shaped protrusion 60 of the first fastener member 48 from projecting beyond the back surface of the base 54 of the second fastener member 50, when the first and second fastener members 48 and 50 are attached to each other.

According to this structure, when the first and second fastener members 48 and 50 are attached to each other, it is possible to position the first and second fastener members at a predetermined positional relationship while permitting a tolerance defined by the relative geometry of the inner surface 62 with the boundary surface 64, the wall-shaped protrusion 60, and the base 54. Accordingly, the first and second fastener members 48 and 50 are provided with means for locating one fastener member with respect to the other fastener member.

Alternatively, although not illustrated, it may be possible to form the base 54 of the second fastener member 50 to be thinner, and provide an opening similar to that shown in FIG. 2 for receiving the wall-shaped protrusion 60, on the article fixed with the second fastener member 50 at a position adjacent to the boundary surface 64 of the second fastener member 50. In this case, the positioning of the first fastener member 48 can be carried out by cooperative movement between the wall-shaped protrusion 60 and the opening.

Figure 6A:
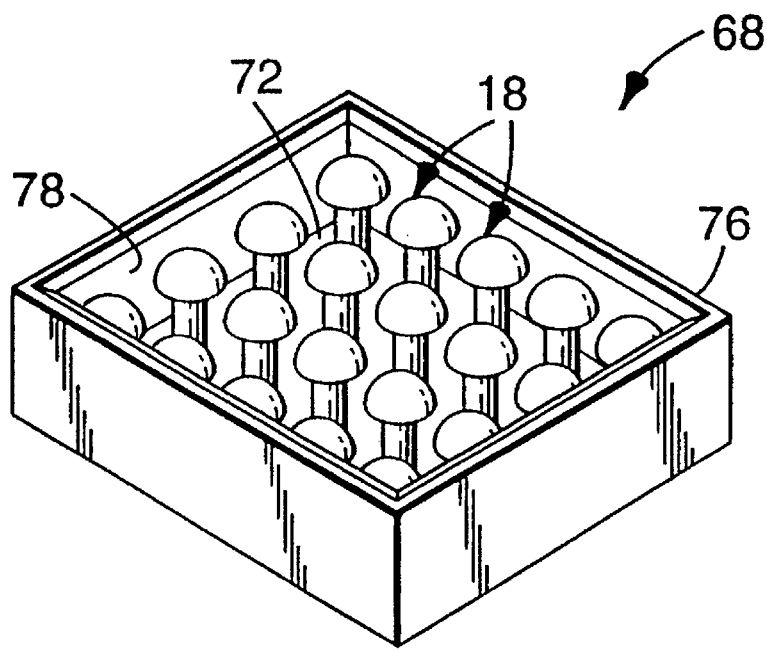
FIGS. 6(a) and 6(b) are perspective views of a third embodiment of a first and second fastener member.
Figure 6B:
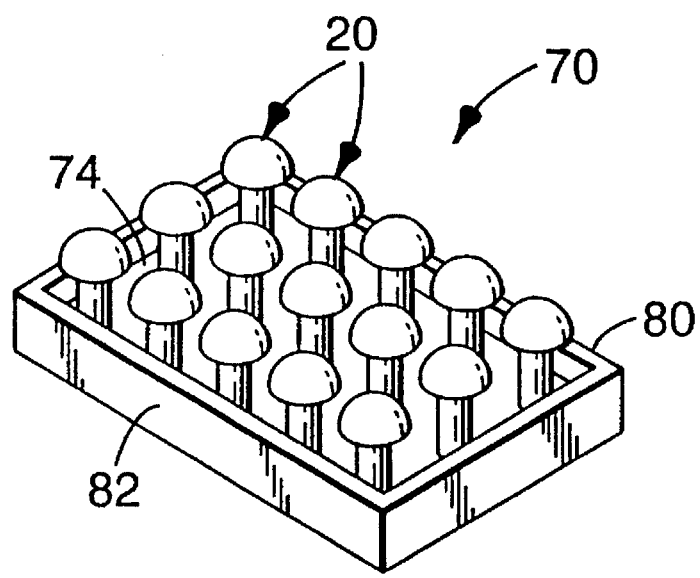
Figure 7A:
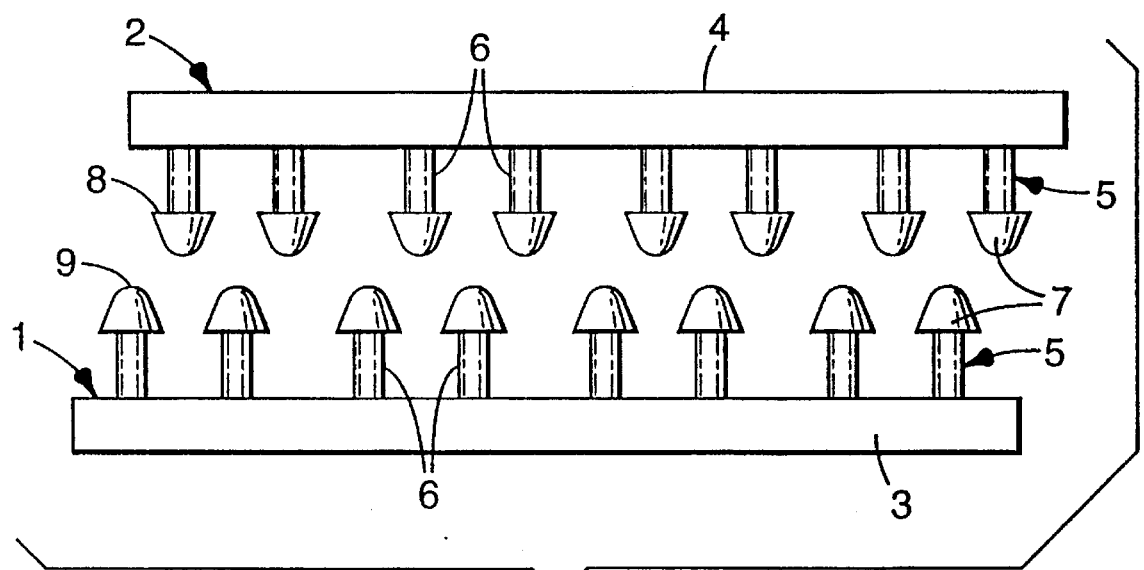
FIGS. 7(a) and 7(b) are side views of a conventional fastener prior to, and following interengagement, respectively.
Figure 7B:
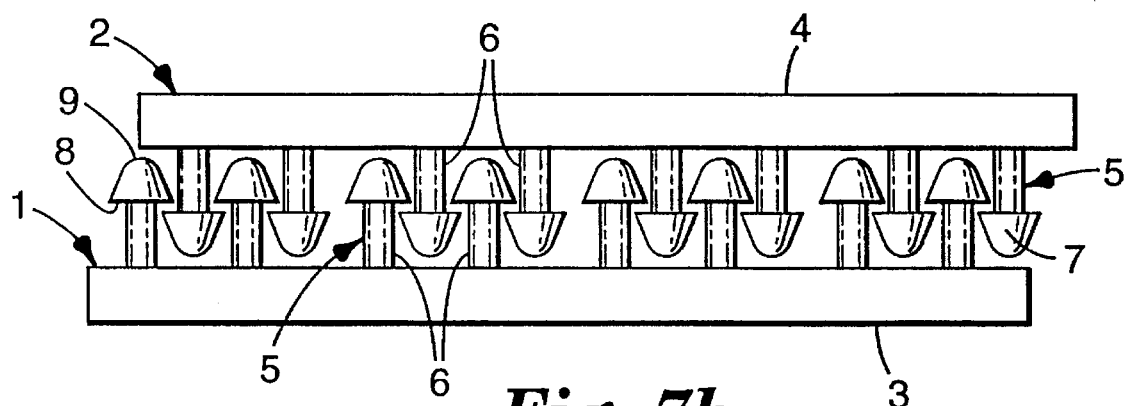
Figure 8A:
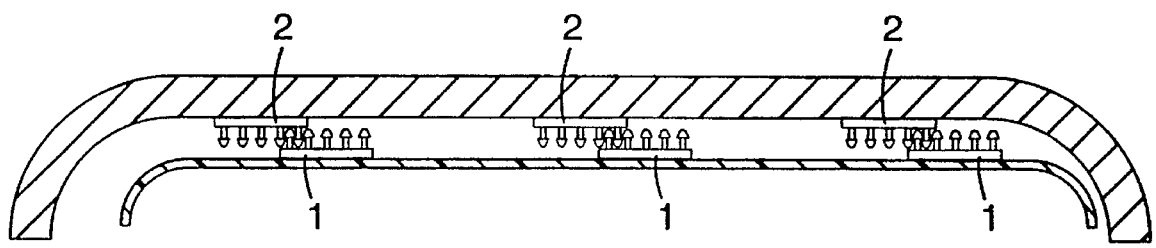
FIG. 8(a) is a cross-section of one application for the use of an interengaging fastener.
Figure 8B:
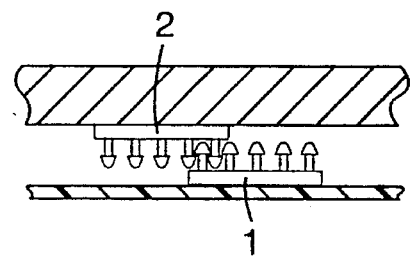
FIG. 8(b) is an enlarged cross-section of a portion of the application shown in FIG. 8(a).

FIG. 6(a) shows a first fastener member 68 of a fastener according to a further embodiment of the present invention, and FIG. 6(b) shows a second fastener member 70 thereof.

Each of the first and second fastener members 68 and 70 has a generally flat base 72, 74, and a plurality of headed stems 18 and 20 projecting generally orthogonally from the respective bases. Each of the headed stems has a same structure as those of the embodiments shown in FIGS. 1 and 4.

The first fastener member 68 has a wall 76 extending substantially uprightly around the entire peripheral edge of the base 72. The wall 76 has a projecting inner surface 78 extending in the height direction as at distance larger than the height of the headed stem 18. The second fastener member 70 has a wall 80 extending substantially upright in the height direction of the headed stem 20 on the entire peripheral edge of the base 74. The wall 80 has a projecting outer surface 82 extending in the height direction at a distance shorter than the height of the headed stem 18. The outer surface 82 of the wall 80 constitutes a boundary surface in the present invention.

In this embodiment, a total height of the wall 76 of the first fastener member 68 plus the height of the wall 80 of the second fastener member 70 is greater than a total height of the headed stems of the first fastener member 68 plus the height of the headed stem 20 of the fastener member 70. The base 74 of the second fastener member 70 may have a substantially rectangular shape in a plan view, which is similar to that of the base 72 of the first fastener member 68 and in which the respective edge of the base 74 is shorter by a predetermined value than a distance between a pair of sections of the wall 76 confronting each other.

According to this structure, the first fastener member 68 and the second fastener member 70 can also be attached with each other at a predetermined positional relationship, while having a tolerance limited by the contacts of the inner surface 78 of the wall 76 with the outer surface 82 of the wall 80. Because the wall 76 of the first fastener member 68 can be formed lower than the protrusion 20 in FIG. 1 or the wall-shaped protrusion 60 in FIG. 4, this embodiment has an advantage in that fastener size is minimized during storage or transportation. Also, because the wall 76 surrounds the headed stems 18 in the first fastener member 68, it is possible to prevent the headed stems 18 from being damaged during storage.

The interengaging fastener member according to the present invention may have any dimensions and shapes. In the above embodiments, for example, the bases 14, 50, 72; and 16, 54, 74 can be formed in any dimensions and shapes, which enable the bases to fixedly hold the headed stems 18, 20, and the protrusion 28, wall-shaped protrusion 60, or wall 80. Also, the headed stem 18 may be formed in any dimensions and shapes. The stem 22 may be of cylindrical, prismatic, or frustoconical shape, and a junction area between the stem and the base may be provided with a radiused curvature to prevent stress concentration. A plurality of stems may be provided for one headed stem. The head 24 may be of a bullet shape or a ball shape, other than the illustrated hemispherical shape. Particularly, it is preferable to exclude any sharp-edged portions from the head 24, for reducing scratch noises during the interengaging procedure. Further, the head 24 may have slits or grooves for reducing an engagement force required for the interengagement by allowing the head to deform during interengagement. Also, the protrusion 28, wall-shaped protrusion 60 and wall 80 may be in any dimensions and shapes, which enable the fastener members to be located at a predetermined positional relationship.

The fastener member according to the present invention may be made of various materials. In the above embodiments, for example, it is possible to use polymeric material such as polyamide resin, polyester resin, polypropylene resin or polyethylene resin. Particularly, polyamide resin is a preferred material because of excellent thermal durability, mechanical strength, and injection-molding aptitude. The bending modulus of elasticity of the materials can be properly modified or changed by adding plasticizer or reinforcing member. Further, it is possible to provide a fastener with a suitable softness by using non-woven cloth or woven cloth. If the back surface of the base 12, 30 is provided with a metal layer, it is possible to obtain a ground to the object to which the fastener member is attached, and to improve adherence of an adhesive layer, when the fastener member is to be fixed on the object. The stems 22 and heads 24 of the headed stems 18, 20, and the protrusion 28, wall-shaped protrusion 60 and wall 80 may be formed by the same polymeric material as that of the base.

The interengaging fastener member according to the present invention may be formed by various methods. In the above embodiments, for example, the fastener member may be made injection molding or extrusion molding, with the protrusion 28, wall-shaped protrusion 60 or wall 80 formed as a separate body is fixed with the fastener member by a suitable method such as adhesion or welding. However, in view of molding accuracy or readiness of procedure, it is advantageous to integrally mold the base, the headed stems, and the protrusion by an injection molding process using a destructible stem mold. An exemplary integral molding process incorporating the use of a destructible stem mold is described in detail in U.S. Pat. No. 5,242,646 (Torigoe et al.), the contents of which is incorporated by reference herein. In this regard, the destructible stem mold is a general term of a mold which is used as a core in a metal mold, and which can be removed by the mechanical or chemical method, such as ultrasonic vibration, melting process, water or solvent dissolution, or disintegration. The destructible stem mold is used as a mold for stems and for the protrusions, and, after integrally molding them with the base and the heads of the headed stems, the destructible stem mold is removed by a suitable method.

As described in detail herein, the fastener of the present invention can be suitably used at a location where a positioning of an article to be fixed is required under a circumstance in which a visual inspection is difficult, such as an installation of a car ceiling liner, because one or both fastener members have means for locating one fastener member with respect to the other. In addition, because a necessary tolerance of positional relationship is easily imparted to a fastener, it is possible to automate the attaching operation without substantial concern for precision by the automated apparatus.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. A fastener having first and second fastener members, each of said first and second fastener members comprising a base and a plurality of headed stems arranged on said base in a predetermined spaced relationship, each of said headed stems including a stem adjoining and projecting from said base, and a head connected to a distal end of said stem, said fastener including means for locating said first fastener member at a predetermined location relative to said second fastener member to facilitate interengagement of the respective fastener members, wherein said means for locating said first and second fastener members comprises at least one protrusion having a length larger than the height of the headed stems of said first fastener member plus the height of the headed stems of said second fastener member, said protrusion being arranged at a position surrounded by said headed stems of said first fastener member, and a boundary surface on said second fastener member that defines at least one opening arranged at a position surrounded by said headed stems of said second fastener member and opposed to said protrusion.

\* \* \* \* \*